United States Patent Office

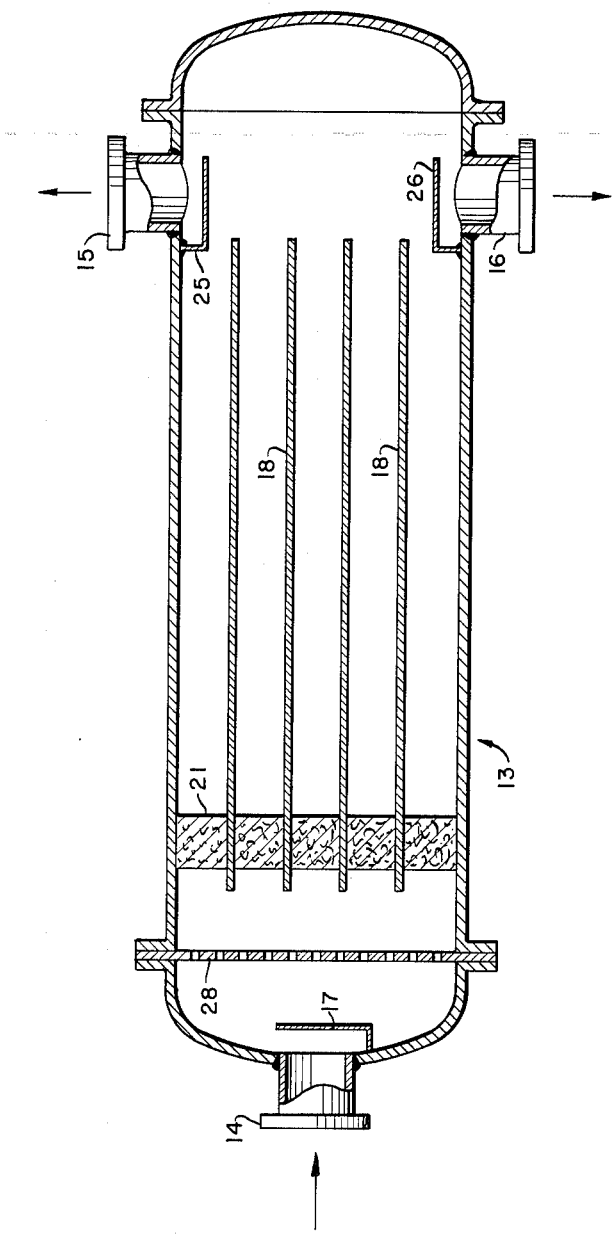
Dec. 7, 1965     J. F. WOICIK ETAL     3,222,413
EMULSION CONTROL IN HYDROCARBON PURIFICATION
Filed June 22, 1961
INVENTORS:
JOSEPH FRANCIS WOICIK
JAMES ALEXANDER BRUMLOW, JR.
BY: *William D. Hager*
THEIR ATTORNEY

3,222,413
Patented Dec. 7, 1965

3,222,413
EMULSION CONTROL IN HYDROCARBON
PURIFICATION
Joseph F. Woicik, Long Beach, and James A. Brumlow, Jr., Los Alamitos, Calif., assignors to Shell Oil Company, New York, N.Y., a corporation of Delaware
Filed June 22, 1961, Ser. No. 118,931
4 Claims. (Cl. 260—677)

This invention relates to a novel process and means for enhancing the purity of hydrocarbon products. In particular, it relates to a method for improving phase separations during purification of olefin hydrocarbon with sulfuric acid. Specifically it relates to an improved method for transferring certain $C_5$ alkenes between hydrocarbon and sulfuric acid phases, particularly in the presence of unsaturated hydrocarbons.

During the manufacture of diolefinic materials, such as isoprene, which is to be polymerized to cis-polyisoprene, it has been found desirable to recover tertiary amylenes from admixture with other similar boiling hydrocarbons of a cracked petroleum fraction, to be used as feed to a dehydrogenation reactor wherein tertiary amylenes are dehydrogenated to isoprene. The tertiary amylenes are advantageously removed from n-amylenes and other $C_5$ materials undesirable for dehydrogenation to polymer feed and which can better be used for other purposes.

In accordance with a method for the separation and removal of such tertiary amylenes, particularly without causing any undue preliminary polymerization thereof, the use of sulfuric acid has been suggested under various conditions of concentration, contact time, and temperature in copending application Serial No. 806,524 filed Apr. 15, 1959, and corresponding Belgian Patent No. 589,716. In accordance therewith, an essentially $C_5$ cracked hydrocarbon feed stream containing tertiary amylenes and other close boiling $C_5$ hydrocarbons, including n-amylenes, and often a small amount of diolefins and/or acetylenic hydrocarbons, is contacted with an aqueous sulfuric acid having specified concentrations and at specified temperatures for sufficient time to extract selectively the tertiary amylenes to the substantial exclusion of n-amylenes, without the formation of substantial amounts of premature polymers. This will be referred to hereinafter as the acid absorption step while the step for the recovery of the tertiary amylenes from the acid will be denoted as the reversion step. The resulting fat sulfuric acid contains the tertiary amylenes principally as tertiary amyl alcohol. Following the separation of the fat sulfuric acid from the remaining hydrocarbon feed stream the fat acid is intimately contacted at elevated temperature with a liquid inert hydrocarbon solvent stream for a time sufficient to accomplish the reversion but not so excessive as to allow undesired and premature polymerization of tertiary amylenes which are to be fed to the dehydrogenation zone as monomers. The process contemplates intense mixing between the hydrocarbon phase and the sulfuric acid phase during the absorption step as well as during the reversion. In the latter, the inert hydrocarbon solvent may be either aromatic or paraffinic and either lower or higher boiling than the tertiary amylenes, and preferably lower boiling. The difference in boiling points should be of an amount sufficient to permit ready fractionation of tertiary amylenes therefrom and for such purpose a boiling point difference of at least 15° C. is preferred. Hexane or octane have been found particularly suitable for this purpose.

The desired branched amylenes (isoprene precursors) to be separated and purified by the improved process of the present invention are 3-methylbutene-1, 2-methylbutene-2 and 2-methylbutene-1, with a considerable portion of 3-methylbutene-1 being lost along with the n-amylenes.

In practicing the process already described, considerable difficulty has been experienced in effecting suitably rapid phase separation in the processing equipment, generally in the form of a settling tank, between the hydrocarbon phase and the sulfuric acid phase into which the tertiary amylenes are first selectively absorbed and then removed therefrom into the inert hydrocarbon solvent; intense mixing is required during both the absorption and the reversion steps with the formation of an intimate mixture of hydrocarbon and acid phases.

It is, therefore, an object of the invention to provide improved means for decreasing the period of existence of emulsion phase involving the acid and hydrocarbon interphases in a process for olefin hydrocarbon purification with sulfuric acid. A further object of the invention is the provision of means whereby settling time for the separation of acid and hydrocarbon phases may be materially decreased without serious modification of existing processing equipment or the addition of expensive implementation thereto. The present invention comprehends the inclusion of a processing step in existing methods for purifying hydrocarbons, which processing step involves passing a mixture of acid and hydrocarbon phases, following intense agitation, through a selected coalescing means into a settling tank or the like, to be described in greater detail hereinafter.

It is known that, when using liquid-liquid extraction techniques, the degree of extraction is often a function of the mutual surface area of the contacting liquids. While small particle size of the liquid droplets is advantageous for the purpose of rapid extraction, such small particle sizes often result in separation difficulties which involve emulsification and entrainment. Moreover, in many cases, especially where the difference in gravity between the liquids to be separated is small, or the viscosity of one or both of the liquids is relatively high, emulsification and entrainment are such serious problems that it is often impractical to use extractants which in many other ways are quite desirable. The art teaches various suggestions and proposals in connection with the problem of emulsification and entrainment. For example, the addition of chemical emulsification inhibitors and anti-foam agents to the contacting liquids has been moderately successful. However, as extraction systems differ along with the materials to be extracted, such emulsification inhibitors are usually discovered only by trial and error, hence maximum effectiveness of the process is largely a matter of chance. It is also known that an emulsification inhibitor useful under one set of conditions may, under different circumstances, be quite ineffective and might even promote emulsification.

A principal feature of the invention is the passage of the acid-hydrocarbon intermixture through a fibrous coalescer comprising a body of polyolefin strips, strands, or the like, thereby speeding the separation of the hydrocarbon and acid phases.

Other objects and features of the invention will be more fully understood from a consideration of the drawing, which is a longitudinal partly cross-sectional view of an apparatus especially adapted to carry out the process of the invention.

In accordance with a preferred practice, a catalytically cracked $C_5$ fraction containing tertiary amylenes, n-amylene, pentanes and traces of diolefins such as cyclopentadiene and pentadienes enters a reactor maintained at a temperature of about 40° F. to 60° F. and is mixed with 65% sulfuric acid. The acid may be provided in two streams, one from a recycle leg of the reactor and the other from the bottom of a separator and containing some tertiary amyl alcohol, to be described hereinafter.

The combined acid-hydrocarbon stream is vigorously mixed as by passage through a suitable pump and circulation pipe loop whereby mass transfer of the tertiary amylenes into the sulfuric acid phase is effected and wherein the tertiary amylenes on hydration exist essentially as tertiary amyl alcohol. A portion of the mixed hydrocarbon-acid phases leaving the mixing or reaction zone is recycled to a cooler where its temperature is reduced in the order of 10° F. The thorough mixing of the sulfuric acid with the hydrocarbon phase forms an emulsion which is persistent and extremely difficult to break completely in a reasonable time. In accordance with the invention, the reactor product comprising the mixed phases including the emulsion is passed through a novel coalescing medium therefor and thence into a settler. The novel coalescing medium comprises a mass of fibrous high-molecular-weight poly-$C_{2-3}$-olefin, i.e., polypropylene, polyethylene, or polyethylene-propylene, which may be provided as a baffle pad or mat suspended with a settler tank and so arranged to constitute a permeable barrier to the normal passage of the emulsion therethrough. The use of a mat or bed of the polyolefin of low-molecular-weight olefin, in particular polyethylene, material of a form to provide a high ratio of surface area to mass as a permeable barrier to the flow of the emulsifiable phases has been found to be markedly superior to other fibrous or packing materials. Although the reason for this advantage is not thoroughly understood, it seems that it may be attributable to the characteristic of polyolefin, and especially of polyethylene, to be completely wetted by hydrocarbon while repelling the aqueous sulfuric acid solution. While the polyolefin is for all practical purposes inert to sulfuric acid, its character is also such that it is not unduly dissolved or swelled in the hydrocarbon phase. It is substantially insoluble in the low-molecular-weight hydrocarbons at the temperature wherein the present process is conducted.

The $C_5$ residual stream with its tertiary amylene content substantially reduced is withdrawn from the settler. A portion of the fat aqueous sulfuric acid containing tertiary amylenes as tertiary amyl alcohol may be removed from the bottom of the separator and then returned to the reactor. The fat acid stream containing the recovered tertiary amylenes principally as alcohol is removed from the bottom of the separator, and is passed to a reversion zone, which may comprise a reactor and a settler similar to those of the absorption zone. Immediately preceding entering the reversion reactor, the fat acid is mixed with an inert hydrocarbon solvent stream, such as propane, butane, hexane, heptane, or octane or a mixture thereof such as a $C_{6-8}$ naphtha fraction. In the reversion step, the fat acid is intimately contacted with a lean hydrocarbon solvent initially heated to about 175° F. and sufficient to raise the temperature of the fat acid solvent mixture to a reversion temperature of about 120° F. Here, as in the instance of the absorption reactor an intimate mixing of the hydrocarbon solvent and fat sulfuric acid phases is assured by passage through a circulating pump and suitable conduit. The time of contacting the two phases is minimized to avoid polymerization. The combined solvent-sulfuric acid stream, which may be cooled by indirect heat exchange if desired, may be passed through a coalescing zone, packed similarly to the coalescing zone used in connection with the absorption zone and settler, then into a settler, such as shown in the drawing, with phase separation of the hydrocarbon solvent-tertiary amylene phase and the resulting lean acid phase.

The separate fat solvent-amylene stream is then caustic-washed and then water-washed and then distilled to separate the tertiary amylene from the solvent, now free of $C_5$ hydrocarbons, which is recycled for reuse to extract amylenes from another portion of fat acid.

Referring now in detail to the sole figure of the drawing, there is shown a typical separator-settler tank 13 which might be used either in the absorption or the reversion steps and which is equipped with inlet 14 at the proximinal extremity of tank 13 for admitting thereto the hydrocarbon phase in admixture with the sulfuric acid phase. Outlet 15 is provided at the distal end and top of tank 13 for the exit of hydrocarbon phase and outlet 16 at the distal end and bottom of tank 13 for the exit of the sulfuric acid aqueous phase. Disposed vertically in tank 13 completely from top to bottom thereof and substantially normal to the flow of the materials into the tank through inlet 14 is a penetrable barrier and coalescing medium 21 which is fabricated, for purposes of example, from polyethylene fiber in accordance with directions set forth in detail hereinafter. Cooperating with hydrocarbon outlet 15 is baffle 25, similar cooperating with aqueous phase outlet 16 is baffle 26, and cooperating with inlet 14 is baffle 17. Perforated plates 28 extend throughout a right section of the horizontaly disposed cylindrical tank bar at the proximal end thereof.

In operation, the mixture of sulfuric acid, amylenes, and other hydrocarbons is fed into settling tank 13 illustrated by the drawing in accordance with the flow lines indicated therein. As the mixture passes into the settling tank it may or may not commence its phase separation prior to contact with the penetrable barrier. At any rate, following its passage through such barrier, particularly in the case wherein polyethylene fibers are used and constructed in a manner to be described in greater detail hereinafter, separation of the mixture is greatly accelerated to the point of providing operability and economic attractiveness to the over-all process. The polyethylene fiber barrier supplies a very large liquid impingement area uniformly distributed throughout its mass. Entrained droplets in the liquid mixture contact the surface of the polyethylene fibers and are retained thereon for a time sufficient to allow them to merge with other similar droplets. In this manner the rate of coalescence of the two phases is greatly accelerated, undesirable entrainment of hydrocarbon in the aqueous phase is reduced or even eliminated, and higher unit throughput rates are obtained.

Although the position of the polyethylene fiber penetrable barrier in the settling tank is not of primary significance in the present invention, its maximum utility is obtained only when it completely covers a vertical cross-sectional area of the tank, preferably substantially at right angles to the direction of flow of the emulsion. Its location along the horizontal dimension of the tank is of no appreciable concern, although it is preferable to so position the penetrable barrier that its coalescing action occurs just after the admission of the mixture into the settling tank. It is contemplated that variations in the position of the barrier may be employed to suit the processing conditions. Moreover, the dimensions and density of the barrier may vary within relatively wide limits.

The polyolefin material is that conventionally known in the art and is used in the form of fibers. By "fiber" is meant a material whose length is at least 100 times its diameter, thereby providing a slender filament-like configuration. The term "fiber" as used herein refers to shape rather than to any other property. Fibers of polypropylene and of copolyethylene-propylene, as well as polyethylene, are also insoluble in low-molecular-weight hydrocarbons at temperatures not above their known boiling points and are, therefore, useful in this process. Thus, polyolefins which tend to dissolve or swell in the hydrocarbon phase under the conditions attendant to the process are unsuitable. Molecular weights of the polyolefins may vary within relatively wide ranges; suitable representative polyolefins are those with molecular weights within the approximate range of from 50,000 to 1,000,000, with the range of from 100,000 to 300,000 predominating.

As mentioned earlier the polyethylene fibers are preferably fashioned into a penetrable barrier through which the mixture of aqueous acid, residual $C_5$ hydrocarbons and the emulsion thereof are passed, preferably normal to the barrier. In general, this penetrable barrier of polyethylene fiber has a packing density from 18.1 lbs./ft.$^3$ to 24.7 lbs./ft.$^3$ and a void volume from 0.71 ft.$^3$/ft.$^3$ to 0.83 ft.$^3$/ft.$^3$ and an area of from 637 ft.$^2$/ft.$^3$ to 851 ft.$^2$/ft.$^3$. Within the above ranges, a packing density of approximately 21.3 lbs./ft.$^3$ with a void volume of 0.77 ft.$^3$/ft.$^3$ and an area of approximately 744 ft.$^2$/ft.$^3$ represents a preferred embodiment.

*Example*

A catalytically cracked C$_5$ fraction containing 41% by weight tertiary amylenes is passed into an absorption zone wherein it is contacted with sulfuric acid of about 65% wt. strength; the aqueous acid to feed ratio being about 1.3 lb./lb. for a feed containing typically 41% tertiary amylenes and the temperature being approximately 50° F. The combined acid-hydrocarbon stream is thoroughly intermixed and vigorously agitated by passage through a centrifugal circulator pump and conduit. Such mixing promotes the absorption of the tertiary amylenes into the sulfuric acid phase. Following such agitation an emulsification of the two phases into a hydrocarbon-in-acid system occurs and persists. The mixture is then passed through a polyethylene coalescer 27 inches thick and covering the entire cross-section of a horizontal settling tank 28 feet long by 9 feet in diameter. The volume of the fiber coalescer is 143 ft.$^3$ and contains 3050 lbs. of $\frac{1}{16}$-inch diameter polyethylene fiber, the packing density being 21.3 lb./ft.$^3$. The flow rate through the coalescing medium is about 0.1 vol./vol./min. The residence time required is less than 130 minutes whereas the residence time is the settler-separator vessel in the absence of the fiber coalescer of the present invention was formerly greater than 220 minutes. Even upon the lapse of such time, only passable phase separation was accomplished.

The foregoing settling times serve as an example of the degree of improvement achieved by practicing the present invention but it should be recognized that the absolute value of residence time requirement may vary appreciably. By incurring the cost of replacing a large portion of the recirculated acid with new acid, build up of emulsifier is minimized, and residence time requirement is diminished. The settling times recited hereinbefore are based upon an acid bleed rate of 15% of that circulated.

The undissolved C$_5$ hydrocarbon phase now rapidly separates from the underlying fat sulfuric acid phase and is removed therefrom.

The fat acid stream containing the extracted tertiary amylenes principally as alcohol is then intimately mixed with a hot naphtha (ca. C$_8$ average) in a solvent-to-fat acid ratio of 1.0 lb./lb. The naphtha is heated so that the temperature of the mixture is maintained at about 120° F. and intimate mixing is provided by a centrifugal pump and suitable conduit therefor. The time of contacting at about 120° F. during said mixing is approximately 2 minutes. The combined naphtha-sulfuric acid mixture is passed into a settler-separator, and, as a result thereof, the tertiary amylenes emerge as product in the naptha stream now fat therewith.

The fat naphtha stream is caustic-washed and then water-washed wherefrom it is fed into a solvent stripper and separated by distillation into an overhead product of tertiary amylenes and a bottoms of the naphtha solvent.

With regard to the improved efficiency provided by the process of the present invention, it has been found that under normal operating conditions of from 50,000 to 70,000 barrels per day of hydrocarbon feed wherein 1500 to 2500 barrels per day, respectively, of tertiary amylenes are recovered, the Murphree efficiency rating has been phenomonally increased from levels under 10%, to wit, 3.5% to 6.6%, to percentages as high as 80.7%, with at least from 62.3% to 68.2% predominating. The Murphree efficiency is described in Chemical Engineers' Handbook, by Perry and is further referred to in "Absorption and Extraction," by Sherwood, 1937, McGraw-Hill Company.

While the polyolefin coalescer is most advantageous in connection with its incorporation into a horizontally disposed setting tank, as has been described hereinbefore, the invention further contemplates the use of such means in conjunction with vessels of other geometric configurations at various stages of the process wherein a more efficient phase separation of hydrocarbon from acid is desired.

While the foregoing example is offered as an illustration as one preferred embodiment of the invention, it will be readily appreciated that certain modifications of the process may be made without sacrifice to the true spirit and scope of the invention as delineated in the claims. For example, the size of the particular apparatus used in the process may vary to suit particular processing conditions. Moreover, the depth of the polyolefin fiber barrier may vary over relatively wide ranges, for example, in a settling tank 28 ft. x 9 ft. in diameter, the thickness of the barrier may be from 1 ft. to 28 ft., with the range of 1 ft. to 2 ft. being preferred. Also the diameter of the polyethylene fiber may vary from $\frac{1}{64}$ inch diameter to $\frac{1}{8}$ inch diameter and the surface thereof may be relatively smooth or even in serrated form. In fact serrated fiber is preferred as being more efficient in view of its high surface area to weight ratio.

We claim as our invention:

1. In a process for the separation of tertiary amylenes from an essentially C$_5$ hydrocarbon fraction by intimately contacting said C$_5$ fraction with sufficient aqueous sulfuric acid to absorb the tertiary amylenes of said C$_5$ fraction to form a mixture of a fat aqueous acid phase containing absorbed tertiary amylenes, a residual C$_5$ hydrocarbon phase and an aqueous acid/residual C$_5$ hydrocarbon emulsion phase, the improvement of effecting rapid phase separation and de-emulsification by passing said mixture of aqueous acid phase, residual C$_5$ hydrocarbon phase and aqueous acid/residual C$_5$ hydrocarbon emulsion phase through a penetrable barrier of fibrous polyethylene having a fiber diameter from $\frac{1}{64}$ to $\frac{1}{8}$ inch and having a fiber length at least 100 times as long as its diameter prior to phase stratification whereby the rate of phase separation is materially increased and said emulsion is substantially broken.

2. A process according to claim 1 wherein the aqueous acid is 65% sulfuric acid.

3. Process in accordance with claim 1 wherein the penetrable barrier of polyethylene fiber has a packing density of from 18.1 lb./ft.$^3$ to 24.7 lb./ft.$^3$ with a void volume of from 0.71 ft.$^3$/ft.$^3$ to 0.83 ft.$^3$/ft.$^3$ an an area of from 637 ft.$^2$/ft.$^3$ to 851 ft.$^2$/ft.$^3$.

4. Process in accordance with claim 1 wherein the packing density is approximately 21.3 lb./ft.$^3$ with a void volume of 0.77 ft.$^3$./ft.$^3$ and an area of approximately 744 ft.$^2$/ft.$^3$.

References Cited by the Examiner

UNITED STATES PATENTS

| | | | |
|---|---|---|---|
| 2,429,965 | 10/1947 | Shearer et al. | 252—331 |
| 2,542,147 | 2/1951 | Krewer et al. | 252—325 X |
| 2,907,717 | 10/1959 | Hann | 252—325 |
| 3,179,603 | 4/1965 | Edwards et al. | 260—677 |

FOREIGN PATENTS 378,658   2/1940   Italy.

DELBERT E. GANTZ, *Primary Examiner.*

ALPHONSO D. SULLIVAN, JOSEPH R. LIBERMAN,
*Examiners.*

C. E. SPRESSER, *Assistant Examiner.*